United States Patent Office 3,219,589
Patented Nov. 23, 1965

3,219,589
CATALYST SYSTEMS AND METHODS OF
MAKING CATALYSTS
Oliver W. Burke, Jr., Pompano Beach, Fla., and Oskar
E. H. Klopfer, Bloomfield Hills, Mich., assignors, by
direct and mesne assignments, to Continental Oil Company, Ponca City, Okla., a corporation of Delaware
No Drawing. Filed Dec. 6, 1961, Ser. No. 157,560
5 Claims. (Cl. 252—429)

This application is a continuation-in-part of now abandoned applications Serial No. 580,477, filed April 25, 1956, Serial No. 641,046, filed February 19, 1957, and Serial No. 649,739, filed November 6, 1957, now Patent No. 2,888,646.

This invention relates to improvements in catalyst systems, to methods of making such catalysts, to polymerization methods and polymers. More particularly, it concerns heterogeneous catalyst systems containing as an essential component multiply metallated organic compounds, i.e., compounds which contain a plurality of metal atoms joined in the molecule by metal to carbon bonds.

Heterogeneous catalyst systems are capable of producing polymers of critically different properties from the polymers obtained by homogeneous catalyst polymerizations, emulsion polymerizations and the like. Further, such catalysts permit polymers of many monomers, e.g., ethylene, to be made at critically lower pressures and temperatures as compared to other known catalysts. This has been fully disclosed in the technical literature, e.g., (a) G. Natta, et al., Proceedings of the International Symposium on Macromolecular Chemistry, Prague, 1957, pp. 191–218; (b) G. Natta, Angew. Chem., 68, 393 (1956); (c) Encyclopedia of Chemical Technology, vol. FS, p. 700; and in various patents, e.g., Belgian Patents 533,362, 534,792, 534,888 and 555,268.

This present invention concerns catalysts of the general type discussed in these publications and now recognized as a distinct class of catalyst materials, for use in the polymerization of ethylenically unsaturated polymerizable materials.

A principal object of this invention is the provision of new, improved heterogeneous catalyst systems. Further objects include:

(1) The provision of such catalysts which have catalytic properties that enable copolymerization and graft-copolymerization to be carried out with monomers having widely different polymerization rates and activation energies.

(2) The provision of new polymerization methods.

(3) The provision of new polymers that have unique elastomeric or crystallinity or thermal-deformation characteristics.

(4) The provision of heterogeneous catalyst systems capable of forming polymers of high molecular weight with controlled segmentation or branching and of forming interpolymers from monomer materials difficult, if not impossible, to interpolymerize by previously known methods.

(5) The provision of special methods for the preparation of the new catalyst systems. Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

These objects are accomplished in accordance with the present invention by the formation of heterogeneous catalyst systems which comprise:

A component (1) and at least one additional component selected from the class consisting of components 2(a), 2(b) and (3), wherein Components (1) is a multiply metalated organic compound having at least two metal to carbon bonds and at least two metal atoms in the molecule, Component 2(a) is a catalyst modifying polar organic compound selected from the group consisting of carboxylic acids, sulfonic acids, alcohols, phenols, mercaptans, thiophenols, enol-forming ketones, amines and amides, Component 2(b) is a Friedel-Crafts compound comprising metal and halogen, and Component (3) is a particulate inorganic material which is anhydrous, insoluble in hydrocarbons, and preferably, chemically unreactive with said components (1), 2(a) and 2(b).

These heterogeneous catalyst systems are employed under substantially anhydrous conditions, preferably in an inert liquid media, to polymerize ethylenically unsaturated materials, particularly olefins, dienes, vinyl compounds or mixtures thereof.

When the new catalyst system employs components (1) and 2(b) with or without component (3), such system is well adapted for producing polymers differing in physical characteristics from those produced when component 2(a) is also present in the system.

Further, when the organic compound is multiply metallated with metal from groups Ia or IIa of the periodic classification, especially an alkali metal or a combination of alkali and alkali earth metals, to form component (1), then one or more such mutiply metallated compounds together with at least one metal-organic component 2(a) and/or at least one component (3), can constitute the catalyst systems. It should be observed that when no component 2(b) is employed either separately or as a complexing portion of component 2(a), the new catalyst systems are especially useful when the monomer or monomers to be polymerized comprise diene or polar monomers, especially in the absence of olefin monomers.

Additionaly, when components 2(a) and/or 2(b) are used, such components react, complex or associate, with the component (1) employed, to produce a multiply metallated organic compound having metal substituents or metal complex substituents in whole or in part different from those of the component (1) used in forming the catalyst system.

When employing component 2(b) in producing the catalyst, it is especially desirable to employ at least one Friedel-Crafts type compound, the metal of which is capable of forming multi-oxidation states.

Furthermore, the order in which the components from groups 2(b) or 2(a) and 2(b) are added to the multiply metallated catalyst component (1) may influence the nature of the catalyst and of the polymers produced thereby.

The multiply metallated compound for component (1), as above indicated, may be polymeric or non-polymeric (which description includes dimer, trimer, tetramer, etc. forms) multiply metallated derivatives of hydrocarbons, and of substituted hydrocarbons the substituents of which are not detrimental to the catalytic activity contributed to the material by the reactions with components 2(a) and/ or 2(b).

The catalyst according to the invention comprises (1) One or more multiply metalled organic compounds together with, if desired, one or more of the following, namely:

2(a) One or more modifying polar compounds

2(b) One or more Friedel-Crafts compounds, and (3) One or more particulate, inorganic, hydrocarbon insoluble material.

The nature of (1), 2(a), 2(b) and (3) will now be set out in turn.

COMPONENT (1)

Component (1) employed for producing the new catalysts consists of one or more multi-metallated organic compounds either non-polymeric or polymeric.

The metal or metals of the multiply metallated component (1) employed in producing the new catalysts are selected from groups I, II, III, IV and the rare metals of the periodic table as follows: from group I, lithium, sodium, potassium, rubidium, cesium, copper, silver; from group II, beryllium, magnesium, calcium, strontium, barium, zinc, cadmium, mercury; and from group III, boron, aluminum, scandium, ytterbium, lanthanum, gallium, indium and thallium and from group IV, titanium, zirconium, thorium, germanium, tin, lead and the rare earth metals.

When the organo-metal compound of catalyst component (1) is an organo-hydrocarbon metal compound then the metal thereof is selected from those metals of groups I, II, III, IV and the rare earth metals of the periodic table set out above. However, if the organo-metal compound of catalyst component (1) is an organo-metal halide compound then the metal thereof is only selected from those metals of groups II, III, IV and the rare earth metals of the periodic table set out above.

When the metal of the organo-metal halide is from groups II then such compounds can only contain a single halogen atom. However, if the metal of the organo-metal halide is from groups III, IV and the rare earth metals then such compound can contain one hydrocarbon group and two or three halogen atoms or two or three hydrocarbon groups and one or two halogen atoms. The term "halogen" is used in its normal significance, i.e., it includes fluorine, chlorine, bromine and iodine. The halogen group of these metal components may be exchanged for hydrogen by treatment with a metal hydride, e.g., sodium hydride.

Where the metal of the organo-metal compound is di-, tri- or tetra-valent, one, in the case of a tri-valent metal up to two, or in the case of a tetra-valent metal up to three valencies can be satisfied, if desired, by the radical of a compound containing an active hydrogen atom as set out under component 2(a) below the hydrogen of which must be metal substituted, especially with an alkali metal.

The carbons of the metal-carbon bonds of the non-polymeric multiply metallated components (1) are contained in a radical of a hydrocarbon selected from this class comprising (a) radicals of the paraffinic type hydrocarbons such as, for example, methane, ethane, propane, butane, isobutane, pentane, the isopentanes, hexane and the isohexanes; (b) of the olefinic type hydrocarbons such as, for example, ethylene, propylene, the butenes, isobutenes, the pentenes, the isopentenes, the hexenes, and the isohexenes; (c) of the cyclo-paraffinic and cyclo-olefinic hydrocarbon type such as, for example, those derived from and including cyclopropane, cyclobutane, cyclopentane, cyclopentene, cyclohexane, and cyclohexene, isopropyl cyclohexene and the terpenes; (d) of the aromatic type hydrocarbons such as, for example, benzene, alkylbenzenes, biphenyl, alkylbiphenyl and other polyphenyls, the naphthalenes, including the alkylnaphthalenes such as the methylnaphthalenes; (e) of the paraffinic type hydrocarbons with aromatic substituents including the above cited paraffins substituted with the above cited aromatic such as, for example, methylbenzene, the xylenes, mesitylenes, ethylbenzene, the ethyltoluenes, the ethylxylenes, isopropylbenzene, the alkyl polyphenyls and the alkylnaphthalenes; (f) of the olefinic type hydrocarbons with aromatic substituents including the olefinics above substituted with the aromatics above such as, for example, phenyl ethylene, isopropenylbenzene, alpha-methyl styrene, the poly-alpha-methyl styrenes including especially the di-, tri- and tetra-alpha-methyl styrenes, the vinyltoluenes and diphenyl ethylene; and (g) of acetylene and its homologues including the aromatic acetylenes. Such radicals may contain further substituents provided the latter are not made to deleteriously affect the catalysts being prepared.

The carbons of the metal-carbon bonds of the polymeric types of multi-metallated component (1) are derived from the following types of hydrocarbons polymers: namely, those polymers of natural or synthetic origin which, on being subjected to metallation according to this invention, yield polymer products containing two or more metal atoms attached directly to carbon atoms of said polymers.

Polymers of natural origin which may be used include the naturally occurring rubber-like hydrocarbons such as Hevea, guttapercha, balata, guayule, chicle, jelutong, *Castilloa elastica*, mangaberia, *Ficus elastica*, manicoba, Kok-saghiz (Russian dandelion), rubber from rubber vines (Cryptostegia), *Funtumia elastica* and the like.

Polymers of synthetic origin which may be used include polymers, copolymers, mixed polymers or interpolymers from hydrocarbon monomers including dienes such as butadiene, isoprene, dimethyl-butadiene, piperylene, phenyl-butadiene and the like, and further from vinyl-aromatic hydrocarbons such as styrene, alpha-methyl-styrene, the vinyl toluenes, the ethyl-vinyl-benzenes, other vinyl-alkyl aromatics such as vinyl-naphthalenes, vinyl-alkyl-naphthalenes, and the like; and further from olefins such as ethylene, propylene, butylenes, amylenes, hexylenes, isobutylene, the isopentylenes, the isohexylenes, and the like including other homologues thereof, and from polymerizable cycloalkanes such as cyclopropane and cyclobutane, and derivatives thereof.

Whether the polymer is natural or synthetic it must be metallatable. This may be achieved if the polymer contains one or more alkyl groups and/or double bonds since such groups and bonds can normally be metallated without undue difficulty.

Polymers used for multiply metallation should preferably be of a hydrocarbon nature although the preformed polymer used in component (1) can be any polymer (which term should be taken to include homoplymers, copolymers, mixed polymers and interpolymers) of natural or synthetic origin either elastic or thermoplastic. Such preformed polymer may also be cross-linked provided that it remains metallatable. The preformed polymer must be dispersible or soluble in the solvent medium employed for polymerization according to the invention or in the liquid monomer. The preformed polymer must not cause substantial destruction of the other components of the catalyst employed and should not, for example, contain a substantial number of acidic, basic and/or hydroxyl groups. Such preformed polymer is preferably a hydrocarbon polymer.

The method of metallation by halogen group substitution may be employed to form the organo-metal compound from certain metals of group I of the periodic table that is lithium, sodium, potassium, ribidium and cesium and from group II that is beryllium, magnesium, zinc, cadmium and mercury and in some instances calcium, magnesium and barium and from groups III aluminum gallium, indium and thallium by employing these metals per se in the form of their dispersion powder or turnings and to form the metal organic compounds such metals are reacted with organic halides. The organic halides herein employed are halogen substituted organic hydrocarbons and the hydrocarbon radical thereof being any of those cited above as components of the organo-metal compounds and such being singly or polyhalogen substituted. While the mono-substituted halides have been principally exemplified herein the di, tri, tetra and even penta-halogen substituted hydrocarbons may be employed and the substitution may be of a single halogen type such as a fluoro, chloro, bromo, or iodo substituent in producing the substituted metal-organic compounds by this means residual halogen can remain in the hydrocarbon radical and or unsaturation introduced and still produce catalyst component (1).

The readily available lithium, sodium or potassium, rubidium or cesium hydrocarbon compounds, especially those of sodium are produced by reacting sodium metal with an alkyl halide, especially methyl chloride, ethyl chloride, n-propyl chloride, n-butyl chloride, n-amyl chloride, etc. The n-amyl sodium compound is typical of this group and has accordingly been used in many of the examples herein.

The group I$a$ alkali metal hydrocarbon compounds may be converted to group I$b$, II, III and IV metal hydrocarbon compounds or to metal organic halide compounds or to group II, III and IV metal hydrocarbon compounds and/or metal organic halide compounds complexed with group I, II and III metal halides or zirconium oxyhalides by reacting the group I$a$ metal hycrocarbons with anhydrous, halide salts from metals of group I$b$, II, III and zirconium oxyhalide therewith. Thus for example one mol of aluminum trichloride reacts with one mol of lithium ethyl to form aluminum ethyl dichloride, with two mols of lithium ethyl to form aluminum diethyl monochloride, with three mols of lithium ethyl to form aluminum triethyl, with four mols of lithium ethyl to form lithium aluminum tetraethyl; and likewise for the other alkali metal hydrocarbons and groups II, III and IV metal halides.

COMPONENT 2(a)

The catalyst modifying polar compounds are employed as complexes or as complex formers, are complex-forming, organic donor compounds containing oxygen and/or nitrogen and/or sulphur, and/or selenium, and/or tellurium and/or halogens and which preferably contain less than 32 carbon atoms and desirably less than 18 carbon atoms and in certain instances polymeric materials from monomers under this classification. Such donor compounds include organic acids, amino acids, ketones, diketones, aldehydes, acetals, esters, ketoesters, ethers, alcohols, phenols, ureas, amines, amides, nitriles, nitro- and nitroso-compounds, thioethers, hydroxythioethers, mercaptans, mercaptoethers, thiophenols, sulphones, and selenium and tellurium compounds similar to the preceding sulphur compounds, and halides and included among these are the activating additives cited heretofore for the polymerization of preformed hydrocarbon polymers by alkali metals. Further, the modifying polar compounds can include the oxygen or nitrogen-containing compounds of the free-radical generating type known as polymerization initiators and include dialkyl peroxides, such as methyl-t-butyl peroxide and di-t-amyl peroxide; arylalkyl peroxide such as ditriphenol methyl peroxide; the polyalkylidene peroxides, acetone perioxides, benzaldehyde peroxide and cyclohexanone peroxides; the azo compounds such as 2-azo-bisisobutyronitrile, 2-azo-bis-2-methylbutyronitrile, 2-azo-bis-2-methylheptonitrile, 1-azo-bis-1-cyclohexane carbonitrile, 2-azo-bis-isobutyric acid methyl ester and other azo compounds capable of activating polymerization.

Such donor compounds further include those compounds cited above in which the active hydrogens as, for example, in the carboxylic acids, sulphonic acids, alcohols, phenols, mercaptans, thiophenols, enol-forming ketones secondary amines and secondary amides, is replaced by a suitable metal selected from the metals employed as substituents of component (1) above or of component 2($b$) below, providing the metal is catalytically compatible with the metal compounds employed in the other catalyst component or components.

These complex-forming donor compounds containing oxygen and/or nitrogen and/or sulphur, in certain instances can be employed per se as the catalyst-modifying polar component 2($a$).

Further, the complex-forming donor compounds may be complexed with one or more multiply metallated hydrocarbon-metal-halide compounds, for example, the mixed alkyl and/or aryl-metal-halides including the fluoro-, chloro-, bromo- and iodo-metal alkyl or aryl compounds as, for example, of the Grignard type, to form component 2($a$). The hydrocarbon portions of such complexing compounds are selected from the hydrocarbons employable to form component (1) above. The metals of such complexing compounds are selected from the group consisting of the metals from which component (1) above is derived, the metals from which the Friedel-Crafts compounds of component 2($b$) below, are derived, and also lead.

Further, the complex-forming donor compounds may be complexed with one or more of the Friedel-Crafts compounds of component 2($b$), hereinafter described, to form component 2($a$).

Just as the order of combination of the catalyst compounds influences the nature of the catalyst and of the polymers produced thereby, so it has been found that while the complexing of component 2($a$) may be effected in situ in the presence of components (1) and/or 2($b$) the complexing of this component before combination with the components of the catalyst generally produces a catalyst yielding an improved product.

Any of the catalyst modifying polar components 2($a$) containing oxygen, and/or nitrogen and/or sulphur can be used singly or in admixture especially when polymerizing monomers by catalysts prepared in the presence of such monomers, then if the 2($b$) Friedel-Crafts component is in the lower oxidation state then when employing 2($a$) modifying polar component such may be an oxidizing agent, e.g., a peroxide. While when the 2($b$) Friedel-Crafts component is in a higher oxidation state then the 2($a$) modifying polar component may be a reducing agent, e.g., an amine and it is often desirable to employ as the 2($a$) component both oxidising and reducing agents at the same time.

When boron fluoride is being used as a Friedel-Crafts catalyst in connection with this invention, polar compounds containing active hydrogen can be used to form complexes such as aliphatic alcohols such as ethyl alcohol, propyl alcohol, butyl alcohol, etc., phenols like ethyl phenol and carboxylic acids like formic and acetic acid.

Generally, we prefer to employ polar compounds in which the hydrogen is displaced by a metal from groups I, II and III.

Especially suitable are the ethers such as the dialkyl ethers and alkyl aryl ethers including diethyl ether, methylethyl ether, diisopropyl ether and ethyl phenyl ether.

In limited quantities polar alkyl halides are useful, such as the fluorides, bromides such as ethyl fluoride, propyl fluoride, butyl bromides and the chlorides like carbon tetrachloride and chloroform.

COMPONENT 2(b)

The catalyst components herein referred to as of the Friedel-Crafts compounds containing metal and halogen that may be used in preparing the catalyst systems employed in this invention, consist of not only the acidic chlorides, but also the halides, oxyhalides, and halide complexes with halogen acids, of the following metals: magnesium, zinc, cadmium, mercury, boron, aluminum, gallium, titanium, zirconium, tin, lead vanadium, niobium, tantalum, antimony and bismuth, chromium, molybdenum, tungsten, uranium, tellurium, iron, cobalt and nickel, especially including the oxyhalides of group VI metals.

Also usable are the oxyhalides of zirconium, e.g., the oxychloride $ZrOCl_2$, the oxybromide $ZrOr_2$; the oxyhalides of vanadium, e.g., the mono-oxychloride $VOCl$, vanadyl chloride $(VO)_2Cl$, vanadyl dichloride $VOCl_2$, vanadyl trichloride $VOCl_3$, vanadyl monobromide $VOBr$, vanadyl dibromide $VOBr_2$, vanadyl tribromide $VOBr_3$; the oxyhalides of columbium, e.g., oxychloride $CbOCl_3$, oxybromide $CbOBr_3$; the oxyhalides of chromium, e.g., the oxychlorides $Cr_4O_3Cl_6$, $Cr_{10}O_3Cl_{24}$, $Cr_6O_3Cl_{12}$, $CrOCl$, $Cr_2OCl_4$, $Cr_3O_8Cl_2$, $(CrO_2)_8Cl_6$, $Cr_8O_9Cl_4$, $CrOCl_3$, chromyl chloride $CrO_2Cl_2$, chromyl bromide, $CrO_2Br_2$, chromyl iodide $CrO_2I_2$ and chromyl fluoride $CrO_2F_2$; the oxyhalides of molybdenum, e.g., the oxychlorides $MoOCl_4$, $MoO_2Cl_2$, $MoOCl_3$, $Mo_2O_3Cl_6$, $Mo_2O_3Cl_6$, the oxybromides $MoO_2Br_2$, $Mo_3O_5Br_8$, the oxyfluorides $MoOF_4$; the oxyhalides of tungsten, e.g., the oxychlorides, $WO_2Cl_2$, $WOCl_4$, the oxybromides, $WO_2Br_2$, $WOBr_4$, the oxyfluorides $WO_2F_2$, $WOF_4$; the oxyhalides of uranium, e.g., the chlorides $UOCl_4$, $UO_2Cl_2$, the oxybromides $UOBr_4$, $UO_2Br_2$, the oxyfluorides $UOF_4$, $UO_2F_2$, the oxyhalides of selenium, e.g., the oxychlorides $SeOCl_2$, the oxybromide $SeOBr_2$, the oxyfluoride $SeOF_2$; the oxyhalides of tellurium, e.g., the oxychloride $TeOCl_2$, the oxybromide $TeOBr_2$, the oxyfluoride $TeOF_2$. Especially useful are the liquid or low melting oxyhalo Friedel-Crafts compounds such as $VOBr_3$ (red liquid), $VOCl_3$ (yellow liquid), $CrO_2Cl_2$ (red liquid) and the like.

Especially active catalysts are produced when catalyst component (1) is combined with at least one oxyhalo-Friedel-Crafts component 2(b) and at least one non-oxyhalo-Friedel-Crafts component 2(b) with or without a cataylst polar modifying component 2(a) and with or without additional catalyst carried component (3).

When polymerizable hydrocarbon dienes are being polymerized by the catalysts of this invention, and such catalysts are prepared from alkali-metallated hydrocarbons, it is not necessary to include component 2(b), and when for such polymerizations a content of component 2(b) is employed containing a quantity of halogen stoichiometrically less than that of the alkali metal of the metallated hydrocarbons for the purpose of varying the physical characteristics of the diene polymer being produced, then Friedel-Crafts type compounds of single or multi-oxidation state metals can be employed for varying the degree of branching, the ratio of 1:2 to 1:4 polymerization, and the ratio of cis- and transconfiguration of the 1:4 polymerization. Thus by appropriate selection of the catalyst components virtually complete cis-1:4 polymerization and vitually complete trans-1:4 polymerization can be accomplished. The molecular weight of such polymers, while influenced by the temperature and amount of solvent of the recipe is also affected by the polymerization-initiating activity of the catalyst, which I believe is in turn affected by the alkali metal content of the multiply metallated catalyst since we consider the alkali metal substituents thereof to be diene polymerization-initiating parts of the catalyst in the absence of multi-oxidation state Friedel-Crafts type compound or compounds, while we believe that the latter are able to act as initiators especially of alpha-olefin polymerizations, during transition of oxidation state, or in the event of thermal instability.

When dienes and olefins are copolymerized then small amounts of Friedel-Crafts type compounds of multi-oxidation state metals are advantageously employed which, during a transition of oxidation state, or in the event of thermal instability or in reacting with the metal of the multi-metallated hydrocarbon component (1), can actively initiate the copolymerization.

By a mono-oxidation state metal, we mean a metal having compounds in which the metal has, for all practical purposes, only a single oxidation state, for example, aluminum. By a multi-oxidation state metal we mean a metal having compounds in which the metal has two or more oxidation states as, for example, titanium which forms compounds with $+2$, $+3$ and $+4$ oxidation states. For the various oxidation states of the Friedel-Crafts type compounds see W. M. Latimer's treaties entitled, "Oxidation Potentials," published in 1952 by Prentice-Hall, Inc., New York.

When olefins and olefin mixtures are to be polymerized it is again desirable to leave at least a minor amount of one of the Friedel-Crafts type compounds with a multi-oxidation state present for facilitating the initiating of polymerization or copolymerization, and the remaining Friedel-Crafts type compound may be from the single oxidation state metals or also from a multi-oxidation state metal which is not per se, in certain instances, a polymerization initiator, although it may still react with the metal constituent of the multiply metallated component (1) and augment the catalyst system.

The polymerization is believed to proceed because the monomers are absorbed and oriented for polymerization on the multiply metallated hydrocarbon, alone or in combination with the Friedel-Crafts type compounds 2(b) and the components (3). It so happens that the Friedel-Crafts type compounds of multi-oxidation state metals which can initiate a polymerization are often soluble in the solvent and/or monomers employed, and such have been observed to initiate polymerization at points remote from as well as at the catalyst surface, and to yield mixed polymers of the non-oriented and oriented types. Therefore, when oriented polymers only are desired we have discovered that by employing the 2(a) component to suppress the solubility of the initiating multi-oxidation state metal components, only oriented surface contact polymerization is made to occur, yielding oriented or so-called crystalline polymer. By this means a virtually completely oriented polymerization, e.g., of propylene, can be accomplished.

In contrast, when selected multi-oxidation state polymerization-catalyzing Friedel-Crafts type components are employed in greater quantities without the complexing component 2(a) then a non-oriented polymer can be produced, for example, a non-crystalline polypropylene.

By intermediate combination of these components, optimum ratios of oriented and non-oriented types of polymers for desired characteristics (for example, easy mouldability) are produced by the same polymerization.

Further, by special selection of the Friedel-Crafts type compound, e.g., the vanadium chlorides, a polymer of partial crystallinity within the same macro-molecule can be obtained, e.g., a partially crystalline polypropylene can be produced which has the elastic characteristics of the amorphous type and to a degree the tensile strength characteristics of the crystalline type.

COMPONENT (3)

The component (3) may consist of any suitable organic or inorganic solid which is not substantially detrimental to the polymerization. Thus, the component (3) should not act as a poison to any of the other catalyst components. However, it may facilitate the polymerization and may be, if desired, highly absorbent.

The component (3) must, of course, be substantially insoluble in the monomers to be polymerized and in the diluent or solvent employed, if any. Also, the component (3) should be in finely divided form and be readily soluble in water or dilute acid or alkali, so that it may be readily removed from the polymer. The advantage of the insoluble components included hereunder are that such can be pelletized in desired forms, with or without additional binder materials, shaped or compressed into rods, tubes, rings, or other geometrical units, and can be baked and porosified as desired to afford adequate surface exposure. The formed component bodies can then be surface treated with one or more of the components (1), 2(a) and 2(b) in liquid, dissolved, or vapour form, and in appropriate order. The Friedel-Crafts type component 2(b) may be applied to the formed component (3) bodies by sublimation or by drying from solution, and such bodies must of course be capable of withstanding drying temperatures. The multi-metallated component (1) material may be either preformed and applied to component (3) bodies as a liquid or solution depending on the compound concerned, or can be formed in situ on the carrier surface. The modifier components 2(a) are more conveniently applied in the uncomplexed form, and from materials that can be used as liquids, vapours, or as solutions, and when a component 2(a) cannot be applied in one of these forms, it may be formed in situ on the component (3).

The component (3) for the new catalyst systems of this invention includes metals and the hydrides of such metals from groups I to VIII, of the periodic table including from group I, lithium, sodium, potassium, rubidium, cesium, copper and silver; from group II, beryllium, magnesium, calcium, strontium, barium, zinc, cadmium and mercury; from group III, boron and aluminum; from group IV, silicon, titanium, zirconium and tin; from the rare earth metals, from group V, vanadium, columbium, tantalum, antimony and bismuth; from group VI, chromium, molybdenum and tungsten; from group VII, manganese and rhenium; and from group VIII, iron and in special instances cobalt and nickel.

The compounds of the metals that may be used include (a) salts of the aforecited metals with salt-forming components selected from groups II, III, IV, V, VI, VII and VIII including from group II, zincates; from group III, borates and aluminates; from group IV, carbonates, silicates, titanates, zirconates, stannates, plumbates and plumbites; from group V, nitrates, nitrites, phosphates, phosphites, vanadates, arsenates, arsenites, antimonates and antimonites; from group VI, sulphates, sulphites, chromates, molybdates, tungstates, selenates and tellurates; from group VII, the halides, oxyacid halides not included under catalyst component 2(b) and manganates; and from group VIII, ferrates, ferrites and complexes including those of cobalt and nickel. Such compounds further include (b) the hydroxides of the group Ia metals including from this group the hydroxides of lithium, sodium and potassium and (c) the oxides of groups, I, II, III, IV, V, VII, VIII preferably in their lower state of oxidation, that is, from group I, lithium oxide, sodium oxide, potassium oxide and copper oxide; from group II, beryllium oxide, magnesium oxide, calcium oxide, strontium oxide, barium oxide, zinc oxide, cadmium oxide and mercury oxides; from group III, boron oxide, aluminum oxide and rare earth metal oxides; from group IV, silica, titanium oxide, zirconium oxide, tin oxides, thorium oxide and lead oxides; from group V, vanadium oxides, tantalum oxides, arsenic oxides, antimony oxide and bismuth oxide; from group VI, chromium oxide, molybdenum oxides and tungsten oxides; from group VII, manganese oxides and rhenium oxides; from group VIII, iron oxides, cobalt oxides and nickel oxides; and the mixed oxides of these same metals. The oxides may be used as a molecular complex of two or more such as, for example, is present in a silicate and such compounds from the rare earth metals.

Finally, the component (3) may be carbon or a commercial carrier for catalytic agents as employed in the petroleum and chemical industries, and may be used singly or in combination, including co-ordinated combination, and as synthetic or naturally occurring minerals. This component (3) may be separately formed, or may be formed by prior reaction or in situ, in whole or in part, from the combining of the first and second components of the catalyst system, as when transmetallation is employed that produces sodium chloride.

MULTI-METALLATION OF COMPONENT (1) AND COMBINATION WITH OTHER COMPONENTS

The mono-metallation of hydrocarbons may be effected (1) in certain cases by the direct metallation of a hydrocarbon, (2) in certain cases by metal substitution of a hydrocarbon halide, (3) in certain cases by transmetallation, (4) by combinations of such procedures, or (5) by other methods known to the art.

To provide component (1) of the present catalyst it is necessary to effect plural metallation of hydrocarbon, which may be either non-polymeric or polymeric.

This plural metallation may be effected by any of the methods known for mono-metallation, provided the hydrocarbon being metallated is capable of plural metallation by the procedure adopted.

The mono-metallated hydrocarbon compound used to produce the multiply metallated hydrocarbon component (1), may be combined with a component (3) material and/or be complexed with a component 2(a) material, and/or be complexed with a component 2(b) material, prior to its employment as the transmetallating agent, and in such instance the multiply metallated hydrocarbon, whether polymeric or non-polymeric, will be correspondingly combined or complexed.

The proportions of components of the catalyst systems may be varied although there are ratios which are preferred for particular monomers, polymer characteristics and the specific component combinations. Generally considered, component proportions can be expressed in mole ratios as follows:

| Components | Comprehended | Preferred |
|---|---|---|
| (1):(2a) | 0.1:1 to 100:0.01 | 10:1 to 100 to 0.1. |
| (1):(2b) | 0.1:2 to 100:1 | 0.3:1 to 10:1. |
| (1):(3) | 0.1:100 to 100:0.1 | 1:50 to 20:1. |

The proportions of the other components to each other would conform to these ranges.

For the formation of the actalyst and for the polymerization suitable diluents are generally employed such as, paraffins, cycloparaffins, aromatic hydrocarbons and halogenated paraffins, cycloparaffins and aromatic hydrocarbons (when such halogens are sufficiently stable not to interfere with the polymerization). For example, propane, butane, pentane, hexane, octane, isooctane, cyclohexane, methylcyclohexane, benzene, toluene, xylene and the chlorinated derivatives of these compounds, such as chlorobenzene. When polymerizing at low temperatures methyl chloride may conveniently be employed.

The temperature ranges for the polymerization herein considered may be from about —65° C. to 250° C., preferably 65° C. to 150° C., and pressures may be employed between atmospheric and 3000 p.s.i. although the range of atmospheric to 500 p.s.i. is preferred.

The polymerization should be conducted under anhydrous conditions and essentially free of oxygen carbon monoxide and carbon dioxide. Sometimes it is advantageous to use traces of oxygen such as are employed in the high pressure polyethylene process. Excessive amounts of oxygen may be counteracted by adding hydrogen to the polymerization system.

The present invention also includes within its scope a process of polymerization employing a catalyst according to the invention. The polymerization may be carried out in the presence of a diluent; suitable diluents include hydrocarbons. Alternatively, the monomer being polymerized may itself form the diluent.

The diene monomers which may be used herein include butadiene-1:3; isoprene; pentene-1; 2:3-dimethylbutadiene-1:3; 2:3-dimethylpentadiene-1:3; 3:4-dimethylpentadiene-1:3; 2:4-dimethylpentadiene-1:3; 2-neopentyl butadiene 1:3; 2:3:4-trimethylpentadiene-1:3; hexadiene-1:3; 2-ethylbutadiene-1:3; 2-phenyl butadiene-1:3; 2:3-diphenyl butadiene-1:3; cyclohexadiene-1:3; cycloheptadiene-1:3; dimethyl toluene and other polymerizable methyl, ethyl, propyl, isopropyl substituted butadienes, pentadienes, hexadienes-1:3 and hexadienes-2:4 including the cyclodienes, the heptadienes, the octadienes, the hexatrienes, the heptatrienes and the octatrienes such as hexadiene-2:4, hexatriene-1:3:5, octatriene-2:4:6, octadiene-1:3, octadiene-2:4, myrcene. The preferred dienes are the 1:3-dienes and those having 4 to 8 carbon atoms because of the ease of polymerization and the satisfactory polymer yields.

The aryl compounds which may be used include the aryl and the alkaryl substituted olefins such as styrene, the vinyl toluenes, alpha-methyl styrene, the alpha-methyl, vinyl toluenes, the ethyl, propyl, isopropyl, butyl and isobutyl mono and poly substituted styrenes and alpha-methyl styrenes which can broadly be referred to as the alkyl vinyl benzenes, the vinyl biphenyls, the vinyl naphthalenes, allyl benzene, allyl toluene, allyl naphthalene, stilbene, methyl stilbenes, indene, 2,2-dipheny ethylene, triphenyl-ethylene, the phenyl substituted propylenes and butylenes.

In addition to the aryl substituted olefins there may be used halogenated aryl substituted olefins such as the mono-, di-, tri-, and tetra-, chloro-, and bromo substituted aryl, and alkaryl olefins such as styrene, the vinyl toluenes, the various vinyl ethyl, propyl, isopropyl, benzenes and naphthalenes.

Preferred aryl alpha olefins are those having 2 to 6 carbon atoms in addition to the aryl or alkylaryl group and the alkyl of the alkylaryl group is preferred from 1 to 4 carbon atoms.

The olefins which may be used include ethylene, propylene, butene-1, isobutylene, pentene-1, hexene-1, heptene-1, octene-1 and the various methyl, ethyl, propyl, isopropyl butyl and isobutyl substituted 4 to 6 carbon alpha olefins as for instance 3-methyl butene-1, 3:3-dimethyl butene-1, 2:3:3-trimethylbutene-1, 2:2:3:3-tetra methyl-butene-1, 2:4:4-trimethyl pentene-1, and certain of the 2-olefins such as 2-methylbutene-2. The preferred olefins are the alpha olefins having 3 to 6 carbon atoms and ethylene because of the ease of polymerization and the satisfactory polymer yields.

Halogenated olefins which may be used are, preferably, the fluoro, chloro or mixed fluoro-chloro and in some instances the bromo-substituted olefins. The halogen may substitute mono, di, tri or tetra, that is, partially or completely displace the hydrogen of the olefins heretofore cited. Preferred halogenated alpha olefins are from 2 to 6 carbon atoms. Further included herein as diene, vinyl and olefin monomers are those monomers derived from the unsaturated radicals employed as catalyst component (1).

Also included are the acetylenes and especially the low molecular weight polymers of acetylene such as the dimers, trimers and tetramers of acetylene with or without the inclusion of other olefins (e.g., ethylene to the butylenes) in such polymerization and the partial hydrogenated products of such acetylene low molecular weight polymers and copolymers can be employed as monomers in the polymerization contemplated herein.

In connection with the polymerizations of this invention it has been found that halo-monomers can be employed in place of the hydrocarbon monomers, and such halocarbons and halo-hydrocarbon monomers may be polymerized with solid catalyst systems heretofor noted providing such catalysts do not react with the halomonomers in a manner that inhibits polymerization. Certain catalysts may cause dehydrohalogenation but may, nevertheless, result in the production of a useful polymer.

The halocarbon and halo-hydrocarbon monomers include such chlorine containing monomers as vinyl chloride and vinylidene chloride, trichloroethylene, tetrachloroethylene and the like; such fluoro-olefins include vinyl fluoride, vinylidene fluoride, perfluorovinyl chloride (trifluorochloroethylene), tetrafluoroethylene, perfluorobutadiene (hexafluorobutadiene); the halo-, that is, chloro- and fluoro-substituted vinyl aromatic and vinylilene aromatic monomers such as the chloro- and fluoro-substituted styrenes such as dichlorostyrene and fluorostyrene; the chloro- and fluoro-substituted vinyl alkyl benzene such as vinylchlorotoluene; the chloro and fluoro-substituted alpha-methyl styrene in which the substitutionis either in the alkyl or aromatic group such as alpha-methyl-chlorostyrene.

The multiply metallated catalysts may be formed, in whole or in part, in the presence of monomers to be polymerized thereby. The polymerization may be effected with the multiply metallated catalysts either batchwise, or in continuous reactors such as that disclosed in copending Serial No. 694,757, filed November 6, 1957, now Patent 3,091,518 and it will be understood that such alternative procedures may be employed in many instances in lieu of the procedures described to illustrate the practice of the invention in the examples herein.

Moreover, as heretofore shown, where the catalyst actively is dependent upon oxidation state transition of the metals of the Friedel-Crafts type compounds, or due to thermal decomposition of one of the organo-metal compounds, or due to reactions between the Friedel-Crafts type compounds and the multiply-metallated component (1), then catalyst ageing becomes a factor, the catalyst seems most active immediately after its components are combined, and continuous polymerizations provide a means of easily controlling the age of the catalyst. Thus, when the components are combined in the presence of the monomers, the time factor is eliminated.

It has been found that very active catalysts are produced by reacting, e.g., hydrocarbon sodium compounds, especially with multi-sodium metallated hydrocarbon compounds with less than a stoichometric quantity of other groups I, II or III anhydrous metal chlorides and then treating these compounds with a Friedel-Crafts type compound of this invention.

It has also been found that a finished catalyst of this invention formed from catalyst components (1), (2b) and (3) with or without (2a) can often be activated by adding an additional quantity of the mono-metallated or multiply metallated hydrocarbon compound (catalyst component (1)), especially when such is metallated with the metals of group I.

By suitable selection of catalyst and polymerization conditions the catalysts of this invention can polymerize olefins to produce (1) high molecular weight tough polymers which are especially resistant to environmental stress cracking, (2) very high tensile strength polymers which are still flexible (such polymers are especially suitable for fibre production) and (3) polymers with controlled high softening point while retaining a degree of flexibility throughout a wide temperature range (such polymers are especially suitable for structural applications such as piping).

We have found that when the Friedel-Crafts type compounds (catalyst component 2 (b)) of group IV which are less than tetravalent, especially trivalent, e.g., titanium trichloride (prepared, e.g., by reducing titanium tetrachloride with hydrogen), are reacted with catalyst component (1) of this invention, then such catalysts polymerize non-symmetrical alpha-olefins (e.g., propylene) and dienes when polymerizing 1:2 forming oriented or non-random, crystalline polymers. The reason for this may be that these lower valency state Friedel-Crafts catalysts form more stable, less soluble reaction products with catalyst component (1).

We have further found that when the tetravalent Friedel-Crafts type (catalyst compound 2(b)) compounds of group IV, especially titanium tetrachloride is reacted with catalyst component (1) and such component is a multi-metallated compound from group I to form new catalysts of this invention and when polymerizing non-symmetrical alpha-olefins and when polymerizing dienes 1:2 the resulting polymers are non-oriented, random, non-crystalline amorphous polymers. However, when employing catalysts from the tetravalent group IV Friedel-Crafts type compounds and catalyst component (1) where the multi-metallated compound is from group II and group III then mixed polymers of the crystalline and non-crystalline variety are obtained; again the formation of the non-oriented variety of these polymers is due probably to the observation that such catalysts are partially soluble in the monomers or in the hydrocarbon diluents.

We have also discovered that addition of an oxygen, nitrogen or even halide complexing agent catalyst compoent 2(a) together with the Friedel-Crafts type compounds (catalyst component 2(b)) and catalyst component (1) forms a new catalyst in which the formation of the non-oriented polymerization is suppressed and one obtains essentially or only the oriented, crystalline type polymers from monomers of the non-symmetrical olefin type or when dienes are at least in part polymerizing 1:2.

Thus, we have taught through use of the new catalysts of this invention how to produce both the crystalline or oriented polymer, the non-crystalline, amorphous polymers and their mixtures form dienes and/or alpha non-symmetrical olefins and their combinations with or without vinyls and/or symmetrical alpha-olefins. Of course, symmetrical alpha-olefins and 1:4 polymerizing diene monomers always yield crystalline polymers with the catalysts of this invention. However, as the degree of branching of such polymers can be effected by the extent of the multiple metallation of catalysts component (1) new polymers can be produced according to this invention with a high degree of crystallinity and the accompanying high tensile strengths combined with the property of terminal branching which makes such polymers behave as though they were also, to a degree, elastomeric. For example, new polymers such as from ethylene prepared according to this invention did not exhibit environmental stress cracking found in the conventional low pressure polyethylenes. Thus, the new polymers produced with the poly-metallated catalysts of this invention are believed to be superior to the polymers produced by non-metallated catalysts, especially when they are used as structural materials as in the manufacture of plastic piping to be used over a wide temperature range.

The invention will now be illustrated by the following examples which are given by way of illustration only. In these examples parts and percentages are by weight unless otherwise stated. Where ratios are given for co- polymers it will be understood that these ratios refer to starting materials.

*Example 1*

This example illustrates the formation of a polymer having polyvinyl segments employing as a multiply metallatable hydrocarbon, poly-alpha-methyl styrene, as the monomer, styrene, and a metal-organic heterogeneous solid catalyst system formed from the insoluble metal-organic hydrocarbon component allyl sodium, the insoluble carrier compound sodium chloride, and the soluble metal-organic polar compound sodium isopropoxide, and utilizing pentane as a diluent.

The poly-alpha-methyl styrene was type "Resin 276–V2" reportedly prepared according to one of the methods given in U.S. Patents No. 2,621,171 issued December 9, 1952, to G. D. Jones and No. 2,658,058 issued November 3, 1953, to T. E. Werkoma and believed to be a trimer. Any of the methods provided in these patents can be used to prepare the preformed polymer.

The metal-organic heterogeneous solid catalyst system of the allyl-sodium/sodium isopropoxide/sodium chloride type, that may contain some free metallic sodium, can be prepared in various known ways, but I prefer to prepare such a catalyst by a procedure in which, in the absence of air under dry nitrogen (a) four gram atoms of alkali metal (e.g., 92 grams of sodium metal) are heated in about one liter of decane, up to 110–130° C. to melt the sodium, and vigorously stirred with a high speed agitator for 30 minutes in the usual manner to disperse the sodium in finely divided form. Then the stirring speed is greatly reduced and the material cooled to room temperature. After settling, the decane is decanted, the sedimented sodium washed with pentane and then the sodium dispersion is diluted with pentane to a total volume of one gallon, and cooled to between −10° to −18° C. Then (b) two moles of an amyl halide (e.g., 213 grams of amyl chloride) are added over a period of 2–3 hours at −10° to −18° C. under conditions of high speed stirring to produce the reaction

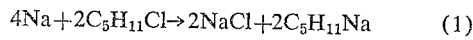

$$4Na + 2C_5H_{11}Cl \rightarrow 2NaCl + 2C_5H_{11}Na \qquad (1)$$

after which the material is allowed to warm to room temperature. Then (c) one mole (102 grams) of diisopropyl ether is added with stirring, which is continued for about one hour, to produce reaction

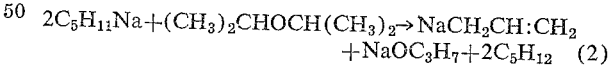

$$2C_5H_{11}Na + (CH_3)_2CHOCH(CH_3)_2 \rightarrow NaCH_2CH{:}CH_2 \\ + NaOC_3H_7 + 2C_5H_{12} \qquad (2)$$

The resulting catalyst suspension comprises about one mole of allyl-sodium, about one mole of sodium isopropoxide, and about two moles sodium chloride.

The polymer is formed by placing in a pressure vessel 350 ml. of dry pentane to which is added 10 grams of poly-alpha-methyl styrene (Dow 276–V2) and 75 ml. of the above solid catalyst allyl sodium/sodium isopropoxide/sodium chloride in pentane, followed by 100 grams of monomeric styrene, the vessel being then closed and lightly shaken for 90 minutes at 30° C. The product was filtered and washed with alcohol, acetic acid and water, then dried. A yield of 105 grams of poly-alpha-methyl styrene-polystyrene was obtained and this polymer had a dilute solution viscosity in benzene of 16.5 as compared with 8.0 for the control polystyrene. This control polystyrene was prepared in a similar manner except that no preformed polymer was added to the mass polymerization system, i.e., 100 grams of styrene in 350 ml. of pentane was polymerized with the same agitation at 30° C. for 90 minutes using 75 ml. of the solid catalyst allyl sodium/sodium isopropoxide/sodium chloride in pentane. The yield of the control polystyrene was 95 grams. The new polymer thus had a very much higher molecular weight than the control polystyrene, even so, this new polymer was much less brittle than the control polystyrene.

Examples 2 and 3 illustrates the formation of a polymer of the polyvinyl-polydiene type employing as a preformed polymer poly-alpha-methyl styrene, with monomeric butadiene and a metal-organic heterogeneous solid catalyst formed from the insoluble metal-organic hydrocarbon compound amyl or allyl sodium, in the presence of the insoluble carrier sodium chloride, plus the soluble metal-organic polar compound sodium isopropoxide, and the diluent pentane.

In Table I the catalyst component 1 with metallation selected from groups I and II of the periodic table, was combined with one or more Friedel-Crafts type compounds component 2(b) in Examples 2, 3, 5 and 6, and the multiply metallated component (1) was used alone in Example 4. In Examples 4 and 5, where the multiple metallation was selected from group II of the periodic table, the p-xylene disodium compound was first prepared and then reacted in pentane with anhydrous barium chloride and anhydrous cadmium chloride, respectively, by ball-milling overnight. Metallation from the other anhydrous chlorides of group II metals may be similarly effected, to produce catalysts incorporating the properties contributed by the respective metals. In Example 3, lithium metal was reacted with amyl chloride to produce lithium chloride and amyl lithium, and the latter was converted to p-xylene dilithium by reacting with p-xylene at 60° C. overnight. This catalyst polymerized isoprene without either component 2(a) or 2(b), however, the yields were improved when a 2(b) component was added as in Example 4. When the p-xylene dilithium is prepared by reacting anhydrous lithium chloride with the p-xylene disodium in pentane a catalytically more reactive composition is obtained than that produced in Example 2, whether such composition is employed with or without component 2(b), and whether polymerizing isoprene, butadiene, or their mixtures with or without the addition of a hydrocarbon vinyl such as styrene.

TABLE I.—EXAMPLES OF CATALYST COMPONENT (1) FROM GROUPS I AND II

| Example No. | 2 | 3 | 4 | 5 | 6 |
|---|---|---|---|---|---|
| Catalyst— | | | | | |
| Component (1)—Muliply metallated compound—Metallated compound Group I: | | | | | |
| Alpha-methyl styrene trimer trisodium (in pentane with sodium chloride), g | 16.2a | | | | |
| p-Xylene dilithium (in pentane with lithium chloride), g | | 6.0a | | | |
| p-Xylene barium (in pentane with sodium chloride), g | | | | 12.1a | |
| p-Xylene cadmium (in pentane with sodium chloride), g | | | 10.8a | | |
| p-Xylene dipotassium (in pentane with potassium chloride), g | | | | | 18.2a |
| Diluent, pentane, ml | 250a | 250a | 200a | 250a | |
| Component 2(d)—Friedel-Crafts type compound: | | | | | |
| AlCl₃, g | 4.4b | | | | |
| Ferro-vanadium chloride, g | | | | 5b | |
| TiCl₄, g | 1.0c | 4.7b | | | 6.4b |
| Diluent, pentane, ml | | | | 45b | |
| Monomers: | | | | | |
| Ethylene, p.s.i | | | | 30c | 400c |
| Propylene, p.s.i | | | | 40b | |
| Butadiene, g | 100d | | | | |
| Isoprene, g | | 40c | | | |
| Polymerization conditions: | | | | | |
| Temperature, °C | 60 | 60 | 50 | 30 | 45 |
| Time, hrs | 16 | 30 | 16 | 2 | 16 |
| Yield, percent | 50 | 50 | 12¹ | 94² | 10 |

¹ An oil.
² Moulded at 205° C., had a 2660 p.s.i. tensile strength at 250% elongation.

The Examples 7 to 13 in Table II teach how simple hydrocarbon compounds having a plurality of methyl groups adjacent to a double bond or an aromatic ring can be transmetallated with alkyl metal compounds of groups I and II; more specifically, how compounds having two or three methyl groups adjacent to a double bond or an aromatic ring or aromatic rings can be metallated in such methyl groups, especially by the alkyl alkali metal compounds and particularly the alkyl sodium compounds to form multimetallated compounds which when reacted with the partic-

TABLE II.—EXAMPLES OF CATALYST COMPONENTS (1) MULTIPLY METALLATED COMPOUNDS

| Example No | 7 | 8 | 9 | 10 | 11 | 12 | 13 |
|---|---|---|---|---|---|---|---|
| Catalyst— | | | | | | | |
| Component (1)—Multiply metallated compound—Multiply metallatable compounds: | | | | | | | |
| o-Xylene, g | 5.8b | | | | | | |
| m-Xylene, g | | 5.8b | | | | | |
| p-Xylene, g | | | 5.8b | | | | |
| Mixed xylenes, g | | | | 5.8b | | | |
| Mesitylene, g | | | | | 4.0b | | |
| Dimethyl naphthalene, g | | | | | | 7.8b | |
| Alpha-methyl styrene trimer, g | | | | | | | 13b |
| Metallating compound: | | | | | | | |
| Amyl sodium (in pentane with sodium chloride), g | 9.4a | 9.4a | | 9.4a | 9.4a | 9.4a | 9.4a |
| Amyl lithium (in pentane with lithium chloride), g | | | 7.8a | | | | |
| Diluent, pentane, ml | 200a | 200a | 200a | 220a | 220 | 220a | 200a |
| Metallating conditions: | | | | | | | |
| Time, hrs | 5 | 5 | 5 | 3 | 5 | 8 | 8 |
| Temperature, °C | 50 | 50 | 50 | 65 | 65 | 50 | 50 |
| Component 2(b)—Friedel-Crafts type compounds: | | | | | | | |
| Aluminum chloride, g | 4.4c | 4.4c | | 4.4c | 4.4c | 4.4c | 4.4c |
| Titanium tetrachloride, g | 1.0c | 1.0d | 3.0c | 1.0d | 1.0d | 1.0d | 1.0d |
| Ball-milling catalysts, hrs | 2c | 2c | | 2c | 2c | 2c | 2c |
| Monomers: | | | | | | | |
| Propylene, p.s.i | 30c | 30c | | 30c | 30c | 30c | |
| Butadiene, g | | | 100d | | | | |
| Ethylene, p.s.i | | | | | | | 500c |
| Polymerization conditions: | | | | | | | |
| Temperature, °C | 30 | 30 | 30 | 30 | 30 | 55 | 70 |
| Time, hrs.¹ | 16 | 42 | 4 | 16 | 16 | 16 | 96 |
| Yield, g | 25 | 18 | 100 | 12 | 17 | 25 | 50 |

¹ Time given in this table is not the reaction time, but the time until polymer was isolated.

ular selected Friedel-Crafts type compounds (catalyst component 2(b)) form the new catalysts which in turn polymerize dienes, vinyls, alpha-olefins or mixtures of these monomers.

The Examples 14 to 19 in Table III teach how a polymeric hydrocarbon compound having a plurality of methyl groups adjacent to a double bond or an aromatic ring can be transmetallated with alkyl metal compounds of Groups I and II, especially the alkyl alkali metals, e.g., the sodium alkyls to form multi-metallated hydrocarbon compounds which when reacted with the particular selected Friedel-Crafts type compound (catalyst component 2(b)) form the new catalysts which in turn polymerize dienes, vinyls, alpha-olefins or mixtures of these monomers.

especially those of titanium and zirconium can be used in conjunction with the multiple metallated compounds of Groups I, II and III to form the new catalysts of this invention. Either the tervalent Friedel-Crafts type compounds (catalyst component 2(b)) or the tetravalent anhydrous Friedel-Crafts type compound (catalyst component 2(b)) can be used with the multi-metallated compounds (catalyst component (1)) to produce catalysts which will polymerize dienes, vinyls, olefins and their mixtures.

Non-symmetrical alpha-olefins and dienes polymerizing completely or partially 1:2 can polymerize in a non-oriented or random manner producing essentially amorphous, non-crystalline polymers or can polymerize in an oriented or non-random manner producing crystalline

TABLE III.—EXAMPLES OF CATALYST COMPONENT (1) MULTIPLY METALLATED COMPOUNDS

| Example No. | 14 | 15 | 16 | 17 | 18 | 19 |
|---|---|---|---|---|---|---|
| Catalyst— | | | | | | |
| Component (1)—Multiply metallated compound—Preparation of prepolymer for multiply metallation monomers: | | | | | | |
| Vinyl toluene [1], g | 50b | 12b | 12b | 12b | | |
| Vinyl toluene [2], g | | | | | 25b | |
| Isoprene, g | | | | | | 10b |
| Prepolymerizing and/or metallating compound: | | | | | | |
| Amyl sodium (in petane with sodium chloride), g | 11.7a | 9.4a | 10a | 9.4a | 11.7a | 9.4a |
| Diluent, pentane, ml | 400a | 220a | 220a | 220a | 650a | 200a |
| Prepolymerizing and/or metallation conditions: | | | | | | |
| Time, hrs | 12 | 12 | 16 | 12 | 12 | 12 |
| Temperature, °C | 28 | 28 | 60 | 28 | 28 | 28 |
| Yield, g | 4.5 | 12 | 12 | 12 | 25 | 10 |
| Component 2(b)—Friedel-Crafts type compounds: | | | | | | |
| Aluminum chloride (sublimed), g | 5c | 4.5c | | | 4.4c | 4.4c |
| Titanium tetrachloride, g | 1.0d | 1.0d | 3.2c | 3.2c | 1.0d | 1.0d |
| Ball-milling catalyst, hrs | 24c | 12c | | | 2c | 16c |
| Monomers: | | | | | | |
| Ethylene, p.s.i | | 500e | 500d | 500e | 500f | 500e |
| Propylene, g | 600e | | | 19d | 59e | |
| Polymerization conditions: | | | | | | |
| Temperature, °C | 30 | 45 | 45 | 48 | 40 | 55 |
| Time, hrs | 16 | 16 | 16 | 3 | 12 | 12 |
| Yield, g | 470 | 50.1 | 39 | 85 | 71 | 33.2 |
| Polymerization composition, percent monomers: | | | | | | |
| Vinyltoluene | 10 | 24 | 31 | 14 | 35 | |
| Ethylene | | 76 | | 84 | | 30 |
| Propylene | 90 | | 69 | 22 | 65 | |
| Isoprene | | | | | | 70 |

[1] This vinyltoluene is 65–70% meta-methyl styrene and 30–35% para-methyl styrene.
[2] This vinyltoluene is 66% para-methyl styrene and 33% ortho-methyl styrene and 1% meta.

The Examples 20 to 27 in Table IV teach how the active Friedel-Crafts type compounds from Group IV, polymers, or in certain cases mixtures of both the oriented and non-oriented polymers can be produced.

TABLE IV.—EXAMPLES OF CATALYST COMPONENT 2(b) GROUP IV—FRIEDEL-CRAFTS COMPOUNDS

| Example No. | 20 | 21 | 22 | 23 | 24 | 25 | 26 | 27 |
|---|---|---|---|---|---|---|---|---|
| Catalyst— | | | | | | | | |
| Component (1)—Multiply metallated compound—Metallated compound: | | | | | | | | |
| p-Xylene disodium (in pentane with sodium chloride), g | 11.2a | 15a | 15a | 15a | 15a | 15a | | |
| Alpha-methyl styrene trimer trisodium (in pentane with sodium chloride), g | | | | | | | 29a | 29a |
| Diluent, pentane, ml | 300a | 400a | 400a | 400a | 400a | 400a | 400a | 400a |
| Component 2(b)—Friedel-Crafts type compound: | | | | | | | | |
| Titanium tetrachloride, g | | 9.5b | 6.4b | 9.5b | 6.4b | 6.4b | 6.4b | 6.4b |
| Zirconium tetrachloride, g | 5.8b | | | | | | | |
| Diluent, pentane, ml | 50b | 95b | 64b | 95b | 64b | 64b | 64b | 64b |
| Monomers: | | | | | | | | |
| Ethylene, p.s.i | | 60c | 150c | 110c [1] | 110c [1] | 78c | 150c | 110c [1] |
| Propylene, p.s.i | 30c | | | | | | | |
| Butadiene, g | | | | | | 15c | | |
| Isobutylene, g | | | | | 15c | | | |
| Isoprene, g | | | | | | | 15c | |
| Polymerization conditions: | | | | | | | | |
| Temperature, °C | 30 | 50 | 52 | 52 | 52 | 52 | 52 | 50 |
| Time, hrs | 16 | 16 | 5 | 16 | 16 | 16 | 16 | 16 |
| Yield, g | 2 | 67 | 72 | 68 | 61 | 85 | 107 | 58 |
| Test Data: | | | | | | | | |
| Moulding temperature, °C | 140 | 140 | 190 | 205 | 200 | 200 | 210 | 180 |
| Tensile strength, p.s.i | 1,450 | 3,560 | 5,340 | 4,700 | 2,860 | 8,500 | 5,550 | 5,800 |
| Elongation, percent | 100 | 400 | 500 | 525 | 400 | | 450 | 600 |

[1] In grams charged.

Examples 28 to 35 in Table V teach how titanium tetrachloride can be employed with group I catalyst component (1) to produce elastomeric material from non-symmetrical alpha-olefins and/or dienes with or without symmetrical alpha-olefins and/or vinyls. By employing a catalyst of this type and including in its formation varying amounts of other Friedel-Crafts catalyst type compounds (catalyst component 2(b)) especially from group V elastomers of controlled crystallinity can be obtained employing dienes, and olefins especially unsymmetrical alpha-olefins. Such new catalysts of this invention permit the production of vulcanizable elastomers of tailored configuration from dienes, dienes and olefins, dienes and vinyls and dienes, olefins and vinyls. Again, the degree of branching can be controlled by the degree of multi-metallation of catalyst component (1).

and 5-oxidation state vanadium Friedel-Crafts type compounds with the modifying polar compounds 2(a) especially with the oxygen type compounds and more specifically with the ethers and forming the catalysts of this invention by further reacting these with catalyst component (1) then the unsymmetrical alpha-olefins and dienes polymerize to form crystalline polymers. The multi-metallated catalysts of this invention depending upon the degree of metallation in the multi-metallated compound yield pollmers with varying degrees of branching which again are new and distinct polymers differing from those produced by non-multi-metallated catalyst.

The columbium Friedel-Crafts type compounds form with catalyst component (1) very unique catalysts. Regardless of the oxidation state of the columbium in Friedel-Crafts type compounds catalysts produced ac-

TABLE V.—EXAMPLES OF ELASTIC MATERIALS

| Example No | 28 | 29 | 30 | 31 | 32 | 33 | 34 | 35 |
|---|---|---|---|---|---|---|---|---|
| Catalyst— | | | | | | | | |
| Component (1)—Multiply metallated compound—Metallated compound: | | | | | | | | |
| p-Xylene disodium (in pentane with sodium chloride), g | 7.5a | 15a | 15a | 15a | 15a | 15a | 7.5a | |
| Alpha-methyl styrene trimer trisodium (in pentane with sodium chloride), g | | | | | | | | 14.5a |
| Diluent, pentane, ml | 200a | 400a | 400a | 400a | 400a | 400a | 150a | 150a |
| Component 2(a)—Catalyst modifying polar compound: Sodium isopropoxide, g | | | | | | | 5.5b | 5.5b |
| Component 2(b)—Friedel-Crafts type compound: | | | | | | | | |
| Titanium tetrachloride, g | 3.2b | 9.48b | 9.48b | 9.48b | 6.4b | 9.48b | | |
| Diluent, pentane, ml | 32b | 94b | 94b | 94b | 64b | 94b | | |
| Monomers: | | | | | | | | |
| Isobutylene, g | | | | | | 142.5c | | |
| Ethylene, g | | | | 76c | 70c | | | |
| Propylene, g | 58c | 142.5c | 142.5c | 75c | | | | |
| Isoprene, g | | 7.5c | | | | | | |
| Butadiene, g | | | 7.5c | 5c | 110c | 7.5c | 20c | 20c |
| Polymerization conditions: | | | | | | | | |
| Temperature, °C | 30 | 53 | 53 | 50 | 53 | 53 | 50 | 50 |
| Time, hrs | 48 | 16 | 16 | 16 | 16 | 16 | 2 | 2 |
| Yield of elastomer, g | 56 | 125 | 78 | 79 | 144.5 | 38 | 7 | 7 |

Examples 36 to 38 in Table VI teach how the active Friedel-Crafts type compounds (catalyst component 2(b)) from group V (catalyst component (2(b)) especially those from vanadium, columbium and tantalum can be used in conjunction with the multi-metallated compounds of groups I, II and III (catalyst component (1)) to form the new catalysts of this invention for the polymerization of dienes, vinyls and olefins. What has been said about the cataylsts from catalyst component (1) and group IV Friedel-Crafts type compounds applies also to group V Friedel-Crafts type compounds with certain modifications.

The vanadium-Friedel-Crafts type compounds (catalyst component 2(b)) behaves like the titanium Friedel-Crafts compounds except that the vanadium catalysts of this invention appears somewhat less soluble and therefore produces mixed crystalline and non-crystalline polymers with a higher crystalline ratio with catalyst component (1) from groups II and III and a degree of crystallinity from catalyst component group I. Thus, vanadium Friedel-Crafts of the oxidation state 4- with the alkali metal multi-metallated compounds produce mixed oriented and non-oriented polymers when polymerizing nonsymmetrical alpha-olefins and dienes. By employing vandadium Friedel-Crafts type compounds (catalyst conponent 2(b)) with less halogen than the vanadium tetrahalides or the vanadium pentahalides then the trend is to crystalline type polymers. To produce the lower oxidation state vanadium halides the vanadium tetrahalides or vanadyl halides are heated in presence of hydrogen and such Friedel-Crafts catalysts when reacted with catalyst component (1) produce new catalysts which polymerize the non-symmetrical alpha-olefins as well as the other alpha-olefins and dienes as well as their mixtures with and without vinyls. Further by combining the 4- cording to this invention have been found to yield when polymerizing alpha-unsymmetrical olefins and dienes crystalline polymers (see Table VIII). Of course, modifying polar compounds 2(a) can be used with the columbium activated catalysts of this invention; however, use of this catalyst component 2(a) in the case of columbium activated catalyst is not essential even when crystalline polymers from propylene are desired.

TABLE VI.—EXAMPLES OF CATALYST COMPONENT 2(b) GROUP V-FRIEDEL-CRAFTS COMPOUNDS

| Example No | 36 | 37 | 38 |
|---|---|---|---|
| Catalyst— | | | |
| Component (1)—Multiply metallated compound—Metallated compound: | | | |
| p-Xylene disodium (in pentanewith sodium chloride), g | | 7.5a | 3.7a |
| Alpha-methyl styrene trimer trisodium (in pentane with sodium chloride), g | 29a | | |
| Diluent, pentane, ml | 400a | 200a | 100a |
| Component 2(b)—Friedel-Crafts type compounds: | | | |
| Vanadium chloride (VCl$_4$), g | | 2.5b | |
| Ferro-vanadium chlorides,[1] | 6.4b | | |
| Ferro-columbium chlorides,[1] g | | | 1.56 |
| Diluent, pentane, ml | 100b | 50b | 50b |
| Monomers: | | | |
| Ethylene, p.s.i | 30c | | 30c |
| Propylene, p.s.i | | 40c | |
| Polymerization conditions: | | | |
| Temperature, °C | 30 | 30 | 30 |
| Time, hrs | 1.5 | 16 | 2.5 |
| Yield, percent | 100 | 87[2] | 100 |
| Test data: | | | |
| Moulding Temperature, °C | 200 | 120 | 190 |
| Tensile Strength, p.s.i | 6,330 | 1,940 | 3,775 |
| Elongation, percent | 400 | 375 | 325 |

[1] Prepared by elevated temperature chlorination of alloy Fe-V and Fe-Cb, Table I.
[2] Consists of mixed pentane soluble and insoluble polypropylene, however, only pentane insoluble polypropylene is obtained by complexing the vanadium chloride with selected (2a) components such as diethylether.

Examples 39 to 41 in Table VII teach how Friedel-Craft type compounds from group VIa can be combined with catalyst component (1) to form the new catalysts of this invention. These catalysts do not polymerize alone unsymmetrical alpha-olefins. However, they will polymerize such monomers in conjunction with other olefins, vinyls and dienes which are by themselves, and in combination, polymerized by the catalysts from this group.

Examples 42 to 47 of Table VIII teach the broad class polar compounds (catalyst component 2($a$)) which can be used to complex the Friedel-Crafts compounds (catalyst component 2($b$)).

Table VIII illustrates how a polymetallated catalyst component (1) which polymerizes dienes and vinyls per se can be modified with a polar active hydrogen compound in which the hydrogen is replaced by a metal from groups I, II or III and in this sodium isopropoxide was used to modify the polymerization of butadiene.

TABLE VIII.—EXAMPLES OF CATALYST COMPONENT 2($a$) MODIFYING POLAR COMPOUNDS

| Example No | 42 | 43 | 44 | 45 | 46 | 47 |
|---|---|---|---|---|---|---|
| Catalyst— | | | | | | |
| Component (1)—Multiply metallated compound—Metallated compounds: | | | | | | |
| p-Xylene disodium (in pentane with sodium chloride), g | 7.5a | 7.5a | 7.5a | 7.5a | 7.5a | 7.5a |
| Amyl sodium (in pentane with sodium chloride), g | 2.3d | 2.3d | 2.3d | 2.3d | 2.3d | 2.3d |
| Component 2($a$)—Catalyst modifying polar compound: | | | | | | |
| Diisopropylketone, g | 2.8c | | | | | |
| N-phenyl-N'-cyclohexyl-p-phenylenediamine, g | | 6.6c | | | | |
| Pyridine, g | | | 2.0c | | | |
| Diethylcarbonate, g | | | | 2.9c | | |
| Butyraldehyde, g | | | | | 1.8c | |
| Morpholine, g | | | | | | 2.2c |
| Diluent, pentane, ml | 700a | 700a | 700a | 700a | 700a | 700a |
| Compound 2($b$)—Friedel-Crafts type compound: Titanium tetrachloride, g | 4.7b | 4.7b | 4.7b | 4.7b | 4.7b | 4.7b |
| Monomers: Propylene, p.s.i | 40e | 40e | 40e | 40e | 40e | 40e |
| Polymerization conditions: | | | | | | |
| Temperature, °C | 30 | 30 | 30 | 30 | 30 | 30 |
| Time, hrs | 16 | 16 | 16 | 16 | 16 | 16 |
| Yield, g | 14 | 21.5 | 8.3 | 6.4 | 8.4 | 7.5 |
| Test data: | | | | | | |
| Moulding temperature, °C | 165 | 165 | 215 [1] | 235 | 230 [1] | 245 [1] |
| Tensile strength, p.s.i | 1,800 | 1,800 | | 1,330 | | |
| Elongation, percent | 350 | 380 | | 500 | | |

[1] Fusing slightly.

TABLE VII.—EXAMPLES OF CATALYST COMPONENT 2($b$) GROUP VIa FRIEDEL-CRAFTS COMPOUNDS

| Example No | 39 | 40 | 41 |
|---|---|---|---|
| Catalyst— | | | |
| Component (1)—Multiply metallated compound—Metallated compound: | | | |
| p-Xylene disodium (in pentane with sodium chloride), g | 7.5a | 7.5a | 7.5a |
| Diluent, pentane, ml | 200a | 200a | 200a |
| Component 2($b$)—Friedel-Crafts type compounds: | | | |
| Chromyl chloride, g | 1.29b | | |
| Ferro-molybdenum chloride,[1] g | | 4.5b | |
| Ferro-tungsten chloride,[1] g | | | 4.7b |
| Monomers: Ethylene, p.s.i | 30e | 30e | 30 |
| Polymerization conditions: | | | |
| Temperature, °C | 30 | 30 | 30 |
| Time, hrs | 16 | 16 | 16 |
| Yield, percent | 100 | 25 | 50 |
| Test data: | | | |
| Moulding temperature, °C | 190 | 160 | 170 |
| Tensile strength, p.s.i | 4,500 | 2,500 | 2,450 |
| Elongation, percent | 10 | 25 | 100 |

[1] Prepared by elevated temperature chlorination of alloy Fe-Mo and Fe-W, Table I.

In Table VIII multiply metallated catalysts are further activated with a catalyst component from copending application Serial No. 694,741 filed November 6, 1957, which is a mono-metallated hydrocarbon compound. The mono-metallated catalysts from this latter case yield polymers generally with lower softening points and hence lower moulding temperatures. When polymers with intermediate properties are desired, a combination of the catalysts from this case and our copending case can of course be made.

In Table IX, Examples 48 to 52, a number of oxygen and nitrogen compounds capable of complex-foaming with the Friedel-Crafts type compounds (catalyst component 2($b$)) or with the reaction product of catalyst component 2($b$) with catalyst component (1) are illustrated. The purpose of these compounds is either to suppress or to increase the activity of the catalysts of this invention in forming non-crystalline, non-oriented polymers from dienes and non-symmetrical alpha-olefins.

It should be noted that several of these oxygen-containing polar complexing compounds have the property of increasing the moulding temperature, that is, the softening point of the polymers.

TABLE IX.—EXAMPLES OF CATALYST COMPONENTS 2(a) MODIFYING POLAR COMPOUNDS

| Example No | 48 | 49 | 50 | 51 | 52 |
|---|---|---|---|---|---|
| Catalyst— | | | | | |
| Component (1)—Multiply metallated compound—Multiply metallatable compound: | | | | | |
| p-Xylene, g | 13.4b | 13.4b | 13.4b | 13.4b | 13.4b |
| Metallating compound: | | | | | |
| Amyl sodium (in pentane with sodium chloride), g | 18.8a | 18.8a | 18.8a | 18.8a | 18.8a |
| Diluent, pentane, ml | 700a | 700a | 700a | 700a | 700a |
| Metallating conditions: | | | | | |
| Time, hrs | 3 | 3 | 3 | 3 | 3 |
| Temperature, °C | 50 | 50 | 50 | 50 | 50 |
| Component 2(a)—Catalyst modifying polar compound: | | | | | |
| Ethyletherate of aluminum chloride (1 to 1 mole ratio), g | | | 4.8d | 7.2d | 6.9d |
| Ethyl ether, g | | 14.8d | | | |
| Component 2(b)—Friedel-Crafts type compounds: Titanium tetrachloride, g | 9.4c | 9.4c | 9.5c | 4.7c | 4.7c |
| Monomers: Propylene, p.s.i | 40d | 40f | 40f | 40f | 40f |
| Polymerization conditions: | | | | | |
| Temperature, °C | 30 | 30 | 30 | 30 | 30 |
| Time, hrs | 24 | 24 | 60 | 60 | 72 |
| Yield, g | 21.8 | 6 | 31.5 | 4.7 | 33.2 |
| Test data: | | | | | |
| Physical appearance [1] | el. | el-pl. | pl. | pl. | pl. |
| Moulding temperature, °C | 100 | 140 | 155 | 160 | 170 |
| Tensile strength, p.s.i | 300 | 2,000 | 2,900 | 3,820 | 4,000 |
| Elongation, percent | 150 | 50 | 650 | 900 | 150 |

[1] pl.=plastic. el.=elastomer. el-pl.=elastic-plastic.

Examples 48 to 56 of Table IX and Table X teach how the modifying polar compounds (catalysts component 2(a), especially the ethers, can be employed to depress the formation of non-crystalline or non-oriented polymers when polymerizing the non-symmetrical alpha-olefins of this invention.

TABLE X.—EXAMPLES OF CATALYST COMPONENTS 2(a) MODIFYING POLAR COMPOUNDS

| Example No | 53 | 54 | 55 | 56 |
|---|---|---|---|---|
| Catalyst— | | | | |
| Component (1)—Multiply metallated compound—Multiply metallatable compounds: | | | | |
| p-Xylene, g | | 13.4b | 13.4b | 11.6b |
| Alpha-methyl styrene trimer, g | 24b | | | |
| Metallating compound: | | | | |
| Amyl sodium (in pentane with sodium chloride), g | 18.8a | 18.8a | 18.8a | 11.6a |
| Diluent, pentane, ml | 700a | 700a | 700a | 700a |
| Metallating conditions: | | | | |
| Time, hrs | 2 | 2 | 2 | 2 |
| Temperature, °C | 60 | 60 | 60 | 60 |
| Component 2(a)—Catalyst modifying polar compound: | | | | |
| Ethyl etherate of aluminum chloride, grams | 6.9d | 2.9d | 6.9d | |
| Ethyl etherate of titanium tetrachloride, grams | | | | 24.2c |
| Component 2(b)—Friedel-Crafts type compound: Titanium tetrachloride, g | 4.7c | 9.5c | 4.7c | |
| Monomers: | | | | |
| Ethylene, p.s.i | 400e | 400e | 60e | |
| Propylene, p.s.i | | | | 40e |
| Polymerization conditions: | | | | |
| Temperature, °C | 50 | 50 | 50 | 30 |
| Time, hrs | 16 | 16 | 16 | 24 |
| Yield, g | 126 | 84 | 37 | 2 [1] |
| Test data: | | | | |
| Physical appearance [2] | pl. | pl. | pl. | pl. |
| Moulding temperature, °C | 210 | 150 | 155 | 120 |
| Tensile strength, p.s.i | 5,150 | 3,440 | 6,680 | 1,500 |
| Elongation, percent | 250 | 300 | 200 | 100 |

[1] When ether was omitted elastomer yield 88% on propylene charged
[2] pl.=plastic.

Examples 57 to 78 in Tables XI to XIV illustrate the preparation of various polymers and copolymers according to the invention. Many of these products are per se new and fall within the scope of the invention.

TABLE XI.—EXAMPLES OF NEW COPOLYMERS OF THIS INVENTION COMPRISING AN ALPHA-OLEFIN

| Example No | 57 | 58 | 59 | 60 | 61 |
|---|---|---|---|---|---|
| Catalyst— | | | | | |
| Component (1)—Metallated compound (in pentane with NaCl): | | | | | |
| p-Xylene disodium, g | 15a | 7.5a | 7.5a | 7.5a | 7.5a |
| Diluent, pentane, ml | 400a | 600a | 600a | 600a | 600a |
| Component 2(b): | | | | | |
| Titanium tetrachloride, g | 9.5b | 1.6b | 1.6b | 1.6b | 1.6b |
| Diluent, pentane, ml | 95b | | | | |
| Monomers: | | | | | |
| Ethylene, g | 110c | | | 10c | 10d |
| Propylene, g | | | 10c | 10d | 10c |
| Isobutylene, g | | 15c | 10d | 10c | 10c |
| Polymerization conditions: | | | | | |
| Temperature, °C | 52 | 22 | 22 | 22 | 22 |
| Time, hrs | 16 | 16 | 16 | 16 | 16 |
| Yield, percent | 68 | 69 | 63 | 66 | 84 |
| Test Data: | | | | | |
| Moulding temperature, °C | 205 | 175 | 120 | 160 | 120 |
| Tensile strength, p.s.i | 4,700 | 4,000 | 1,300 | 1,610 | 690 |
| Elongation, percent | 525 | 150 | 600 | 300 | 175 |

TABLE XII—EXAMPLES OF NEW COPOLYMERS OF THIS INVENTION AND COMPRISING AN ALPHA-OLEFIN AND A VINYL MONOMER

| Example No | 62 | 63 |
|---|---|---|
| Catalyst— | | |
| Component (1)—Metallated compound (in pentane with NaCl): | | |
| p-Xylene disodium, g | 7.5a | 7.5a |
| Diluent, pentane, ml | 600a | 600a |
| Component 2(b): | | |
| Titanium tetrachloride, g | 1.6b | 1.0c |
| Aluminum chloride, g | | 4.4b |
| Monomers: | | |
| Propylene, g | 10c | 55d |
| Alpha-methyl styrene, g | 10d | |
| Vinyl toluene, g | | 30d |
| Polymerization conditions: | | |
| Temperature, °C | 22 | 55 |
| Time, hrs | 16 | 16 |
| Yield, percent | 72 | 10 |
| Test data: | | |
| Moulding temperature, °C | 110 | 100 |
| Tensile strength, p.s.i | 775 | 2,250 |
| Elongation, percent | 75 | 200 |

TABLE XIII.—EXAMPLES OF NEW COPOLYMERS OF THIS INVENTION AND COMPRISING AT LEAST ONE ALPHA-OLEFIN AND/OR A VINYL HYDROCARBON MONOMER AND/OR A DIENE MONOMER

| Example No. | 64 | 65 | 66 | 67 | 68 | 69 | 70 | 71 |
|---|---|---|---|---|---|---|---|---|
| Catalyst— | | | | | | | | |
| Component (1)—Metallated compound (in pentane with NaCl): | | | | | | | | |
| p-Xylene disodium, g | 15a | 15a | 15a | 15a | 15a | 7.5a | 15a | 7.5a |
| Diluent, pentane, ml | 400a | 400a | 400a | 400a | 400a | 600a | 400a | 600a |
| Component 2(b): | | | | | | | | |
| Titanium tetrachloride, g | 6.4b | 6.4b | 9.48b | 9.48b | 9.48b | 1.6b | 9.48b | 1.6b |
| Diluent-pentane, ml | 64b | 64b | 94b | 94b | 94b | | 94b | |
| Monomers, g.: | | | | | | | | |
| Ethylene | 70c | 78c | | | 76c | 10c | 60c | 10c |
| Propylene | | | 142.5c | 142.5c | 75c | 10c | 75c | 10c |
| Isobutylene | | | | | | 10c | | 10c |
| Isoprene | | 15c | 7.5c | | | | 5c | |
| Butadiene | 110c | | | 7.5c | 5c | | | |
| Vinyltoluene (Dow) | | | | | | | | 10c |
| Polymerization conditions: | | | | | | | | |
| Temperature, °C | 53 | 52 | 53 | 53 | 50 | 22 | 50 | 22 |
| Time, hrs | 16 | 16 | 16 | 16 | 16 | 16 | 16 | 16 |
| Yield, percent | 80 | 92 | 83.5 | 52 | 51 | 61 | 75 | 65 |
| Test data: | | | | | | | | |
| Moulding temperature, °C | (1) | 200 | (1) | (1) | (1) | 160 | (1) | 210 |
| Tensile Strength, p.s.i. | | 8,500 | | | | 1,835 | | 400 |
| Elongation, percent | | 150 | | | | 200 | | 10 |
| Vicat melting point, °C | | | | | | | | 150 |

| Example No. | 72 | 73 | 74 | 75 |
|---|---|---|---|---|
| Catalyst— | | | | |
| Component (1)—Metallated compound (in pentane with NaCl): | | | | |
| p-Xylene disodium, g | 15a | 7.5a | 7.5a | 7.5a. |
| Diluent-pentane, ml | 400a | 600a | 600a | 250a. |
| Component 2(b): Titanium tetrachloride, g | 6.4b | 1.6b | 1.6b | 3.2c. |
| Component 2(a): | | | | |
| Sodium isopropoxide, g | | | | 5.3a. |
| Diluent, pentane, ml | 64b | | | |
| Monomers, g.: | | | | |
| Ethylene | | 10c | | 5d. |
| Propylene | 130c | | 10c | |
| Isoprene | 5c | | 10c | |
| Butadiene | | | 10c | 15b. |
| Vinyltoluene (Dow) | 15c | 10c | | |
| Styrene | | 10c | | |
| Polymerization conditions: | | | | |
| Temperature, °C | 50 | 22 | 22 | 22.² |
| Time, hrs | 16 | 16 | 16 | 16. |
| Yield, percent | 73 | 100 | 88 | 100. |
| Test data: | | | | |
| Moulding temperature, °C | 100¹ | | (1) | (1). |
| Tensile strength, p.s.i. | 1,115 | | | (2). |
| Vicat melting point, °C | | 104 | | |

¹ Product was a vulcanizable polymer.
² Butadiene was polymerized 2 hours at 50° C. with the disodium xylene-isopropoxide catalyst prior to addition of TiCl₄ and ethylene. The product vulcanized to 2,500 p.s.i. tensile strength with no added reinforcing agent.

TABLE XIV.—EXAMPLES OF NEW POLYMERS

| Example No. | 76 | 77 | 78 |
|---|---|---|---|
| Catalyst— | | | |
| Component (1)—Metallated compound (in pentane with NaCl): | | | |
| p-Xylene disodium, g | 7.5a | 7.5a | 7.5a |
| Diluent-pentane, ml | 600a | 600a | 600a |
| Component 2(b)—Friedel-Crafts type compound: Titanium tetrachloride, g | 1.6b | 1.6b | 1.6b |
| Monomers, g.: | | | |
| Styrene | | | 50c |
| Vinyl toluene (Dow) | 100c | | 50c |
| Vinyl toluene (Am. Cyan.) | | 100c | |
| Polymerization conditions: | | | |
| Temperature, °C | 22 | 22 | 22 |
| Time, hrs | 16 | 16 | 16 |
| Yield, percent | 97 | 100 | 100 |
| Test data: Vicat melting point, °C | 90 | 94 | 84 |

In all of the foregoing tables, the small letters a, b, c, etc., where they appear, indicate the order of addition of the listed ingredients.

The polymeric compositions exemplified in Tables XI to XIV are listed with the type in Table XV.

TABLE XV.—POLYMERS SHOWN IN TABLES XI TO XIV INCLUSIVE

[O = olefin; V = aromatic vinyl hydrocarbon; D = diene; PV = polar vinyl monomer; 1, 2 and 3 indicate the sequence of polymerization (1 for each monomer indicates simultaneous, hence copolymerization).]

| Example No. | Components (order of polymerization) | Type of product |
|---|---|---|
| 57 | O(1)–O(1) | Plastomer. |
| 58 | O(1)–O(2) | Do. |
| 59 | O(1)–O(1) | Do. |
| 60 | O(1)–O(1)–O(2) | Do. |
| 61 | O(1)–O(1)–O(2) | Do. |
| 62 | O(1)–V(2) | Do. |
| 63 | O(1)–V(1) | Do. |
| 64 | O(1)–D(1) | Vulcanizable elastomer. |
| 65 | O(1)–D(1) | Do. |
| 66 | O(1)–D(1) | Do. |
| 67 | O(1)–D(1) | Do. |
| 68 | O(1)–D(1) | Do. |
| 69 | O(1)–O(1)–D(1) | Plastomer. |
| 70 | O(1)–O(1)–D(1) | Vulcanizable elastomer. |
| 71 | O(1)–O(1)–V(1) | Plastomer. |
| 72 | O(1)–V(1)–D(1) | Vulcanizable elastomer. |
| 73 | O(1)–V(1)–V(1) | Plastomer. |
| 74 | O(1)–D(1)–D(1) | Vulcanizable elastomer. |
| 75 | D(1)–O(2) | Do. |
| 76 | V(1) | Plastomer. |
| 77 | V(1) | Do. |
| 78 | V(1)–V(1) | Do. |

Example 79

Employing a multi-metallated heterogeneous catalyst system the polymerization of vinyl chloride is conducted as follows: to a ball-mill is added 3.7 g. of p-xylene-disodium together with a molar equivalent amount of sodium chloride in 500 ml. of pentane and 6.7 g. of anhydrous aluminum chloride and the mixture is ball-milled 4 hrs.; 7 g. of boron fluoride-ethyl etherate, 1.3 g. of titanium tetrachloride and 3.4 g. of ethyl ether is then added, and ball-milling continued for 2 hrs. The catalyst composition is transferred to a pressure bottle and 35 g. of vinyl chloride is added together with a few ball bearings to cause agitation and the bottle placed in a polymerization box at 50° C. and rotated overnight. It is essential to keep the system free of moisture and air. Oxygen should be substantially eliminated; however it is thought that a minute trace, e.g., a few parts per million might be helpful. Further it is often useful depending on the type of product desired to employ titanium trichloride in place of the titanium tetrachloride. Other Friedel-Crafts compounds can be used in conjunction with boron fluoride.

Example 80

To a ball-mill was added 500 mls. of pentane containing 14.3 g. of alpha-methyl styrene trisodium, a molar equivalent amount of sodium chloride and 5.4 g. of anhydrous aluminum chloride and the mixture was ball-milled for 4 hrs.; 2 g. of titanium tetrachloride was then added and the catalyst was transferred to a pressure bottle, 40 g. of methyl methacrylate were added to the bottle and the bottle was allowed to stand overnight. A 20% yield of polymethyl methacrylate was obtained.

Thus it is shown that multiply metallated heterogeneous catalyst can polymerize polar vinyl monomers when properly selected.

We claim:

1. A heterogeneous catalyst system for the polymerization of ethylenically unsaturated polymerizable materials which comprises:
    (a) an alkyl substituted styrene polymer metallated with at least two metal atoms selected from groups I, II and III metals of the periodic table, the metal atoms being joined to the hydrocarbon molecule by metal to carbon bonds,
    (b) a metal halide Friedel-Crafts compound, and
    (c) an alkali metal halide.
2. A catalyst system as claimed in claim 1 which contains a secondary amine.
3. A heterogeneous catalyst system for the polymerization of ethylenically unsaturated polymerizable material to polymers having a high softening point which consists essentially of:
    (a) α-methyl styrene polymer multiply metallated with sodium
    (b) sodium isopropoxide and
    (c) sodium chloride.
4. A heterogeneous catalyst system for the polymerization of ethylenically unsaturated polymerizable material which comprises:
    (a) trisodium substituted x-methyl styrene trimer,
    (b) ferric chloride
    (c) vanadium chloride, and
    (d) sodium chloride.
5. A method for the preparation of a catalyst as claimed in claim 2 which comprises:
    (I.) complexing a secondary amine with a metal halide Friedel-Crafts compound containing metal and halogen in an inert liquid hydrocarbon,
    (II.) transmetallating a hydrocarbon compound which contains at least two atoms of a metal of groups Ia of the periodic table joined to the hydrocarbon molecule by metal to carbon bond with an anhydrous neutral metal halide, the metal of which is selected from the group consisting of groups I, II and III of the periodic table and which is less electropositive than the metal of the metal hydrocarbon compound, and
    (III.) mixing the products of said complexing step I and said transmetallating step II together in an inert liquid hydrocarbon medium.

References Cited by the Examiner

UNITED STATES PATENTS

| | | | |
|---|---|---|---|
| 2,171,868 | 9/1939 | Scott et al. | 260—94.2 |
| 2,491,116 | 12/1949 | Kraus et al. | 252—429 |
| 2,820,778 | 1/1958 | Spaenig et al. | 252—429 |
| 2,843,576 | 7/1958 | Dunn et al. | 260—92.8 |
| 2,843,577 | 7/1958 | Friedlander et al. | 252—429 |
| 2,881,156 | 4/1959 | Pilar et al. | 252—429 |
| 2,913,444 | 11/1959 | Diem et al. | 260—94.2 |
| 2,933,483 | 4/1960 | Coover | 260—93.7 |
| 2,944,048 | 7/1960 | Nowlin et al. | 252—429 |
| 2,962,451 | 11/1960 | Schreyer | 252—429 |
| 2,962,472 | 11/1960 | Stuart | 260—45.5 |
| 2,965,626 | 12/1960 | Pilar et al. | 252—429 |
| 2,965,627 | 12/1960 | Field et al. | 252—429 |
| 2,981,725 | 4/1961 | Luft et al. | 252—429 |
| 3,007,907 | 11/1961 | Robinson et al. | 252—429 |
| 3,014,017 | 12/1961 | Raum | 252—429 |
| 3,042,626 | 7/1962 | Bruce et al. | 252—429 |
| 3,072,630 | 1/1963 | De Jong et al. | 252—429 |
| 3,116,274 | 12/1963 | Boehm et al. | 252—429 |

OTHER REFERENCES

Morton, "Rubber Age," volume 72, No. 4, January 1953, pages 473–6.

TOBIAS E. LEVOW, *Primary Examiner.*

HAROLD N. BURSTEIN, SAMUEL H. BLECH,
*Examiners.*